Patented Feb. 21, 1950

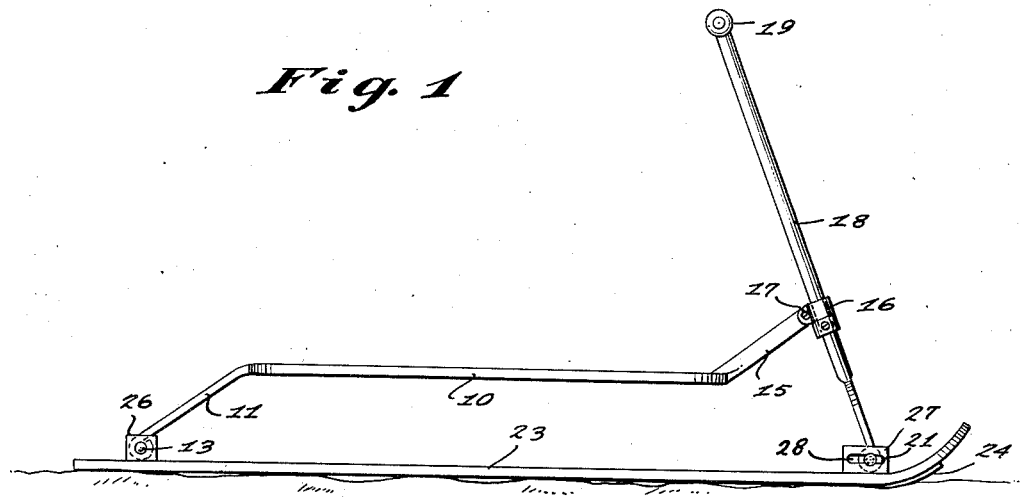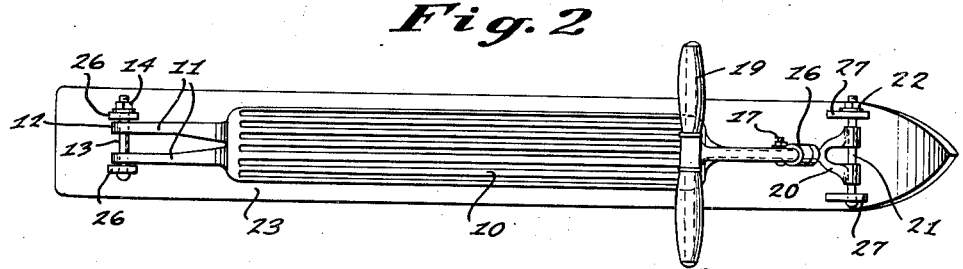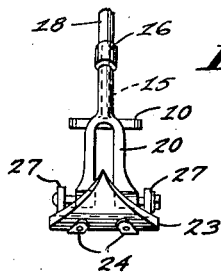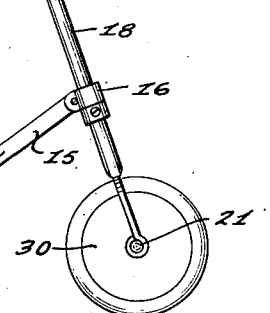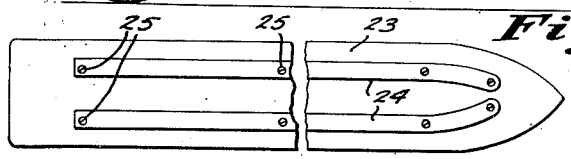

2,497,995

UNITED STATES PATENT OFFICE 2,497,995

COMBINATION SCOOTER AND SLED

Peter Julie, Detroit, Mich.

Application February 3, 1948, Serial No. 5,990

3 Claims. (Cl. 280—7.12)

The present invention relates to a combination scooter and sled and it consists in the combinations, construction and arrangements of parts herein described and claimed.

It is an object of the present invention to provide a combination scooter and sled which may readily be converted from a scooter to a "scooter-type" sled.

Another object of the invention is the provision of a novel platform which may be utilized with either a pair of scooter wheels or with runners.

A further object of the invention is the provision of novel means and mechanism for steering a device of the character set forth above.

Another object of the invention is the provision of novel means in a runner for preventing a skidding thereof.

Other and further objects of the invention will become apparent from a reading of the following specification taken in conjunction with the the drawing, in which:

Figure 1 is a side elevational view of an embodiment of the invention,

Figure 2 is a plan view thereof,

Figure 3 is a fragmentary front elevational view of the device shown in Figure 1, Figure 4 is an elevational view of the device shown in Figures 1 to 3, inclusive, with wheels substituted for the runners, and Figure 5 is a fragmentary bottom plan view of an element of the invention.

Generally, there is provided a scooter adapted for year round use of children and comprising the customary handle and platform to which is interchangeably attached either a pair of wheels or a runner. Provision is made for steering both in the case of the wheels and the runner and novel means is provided in the runner for preventing side slipping or "skidding."

Referring more particularly to the drawing, there is shown therein a longitudinally extending foot platform 10 having an integrally formed downwardly and rearwardly extending pair of legs 11 each bent, as indicated at 12 to receive therebetween a bolt 13 provided with a lock nut 14 or the like. The forward end of the platform is provided with an integrally formed upwardly and forwardly extending bracket 15 terminating in a collar 16 adapted to be clamped by means of a bolt 17 around a steering post 18 which is provided at its upper end with a steering handle 19 and which is formed at its lower end with a yoke 20 through the legs of which is adapted to be passed a bolt 21 provided with a nut 22.

The runner 23 is provided and is preferably formed of wood and is provided upon its bottom face with a pair of metallic longitudinally extending strips 24 which are affixed thereto by means of wood screws 25. The upper face of the runner 23 is provided with a pair of upwardly extending dogs 26 adjacent the rear end thereof and a like pair of dogs 27 adjacent the forward end and are each provided with a horizontally extending slot 28. The dogs 26 accommodate the bolt 13 and the dogs 27 accommodate the bolt 21 in the slots 28 thereof.

It will be seen that by turning the steering post 18 the opposite ends of the bolt 21 will be caused to move in relatively opposite directions in the slots 28. The free movement of the bolt 21 in the slots 28 is limited by the forward end of the slots and further turning of the post 18 will apply a force on the forward end of one slot thus causing a flexing of the runner 23 along the length thereof. The opposite end of the bolt 21 may still slide rearwardly in the opposite slot as the runner is thus flexed thus allowing the runner 23 to be steered by the operator of the scooter.

There is also provided a pair of wheels 29 and 30 which are adapted to be mounted upon bolts 13 and 21, respectively, instead of the runner 23. In this case, there is provided a scooter of the conventional type which is usable and steerable in the conventional manner.

While but one form of the invention has been shown and described herein, it will be readily apparent to those skilled in the art that many minor modifications may be made without departing from the spirit of the invention or the scope of the appended claims.

What is claimed is:

1. A combination scooter and sled comprising a platform, a steering column affixed to the forward end of the platform, a yoke formed at the lower end of the steering column, a pair of dependant legs formed at the rear of the platform, a runner, a pair of upwardly extending lugs adjacent the rear end thereof, a bolt for detachably connecting said lugs to the legs, a pair of upwardly extending lugs adjacent the forward end of the runner and each provided with a horizontally extending slot and a bolt extending through said slots whereby to detachably connect the forward lugs to the yoke.

2. A combination scooter and sled comprising a platform, a steering column affixed to the forward end of the platform, a yoke formed at the lower end of the steering column, a pair of dependant legs formed at the rear of the platform, a runner, pairs of upwardly extending lugs mounted adjacent the forward and rearward ends of the runner, respectively, bolts for detachably connecting the lugs to said yoke and legs and longitudinally extending metallic strips affixed to the lower face of the runner.

3. A combination scooter and sled comprising a platform, a steering column on the forward end of the platform, a pair of dependent lugs on the rear of the platform, a runner, means detachably connecting said lugs to the rear end of said runner, a pair of upwardly extending lugs adjacent the forward end of the runner and each provided with a horizontally extending slot, and a bolt carried by the lower end of said steering column extending through said slots whereby to detachably connect said runner on said scooter.

PETER JULIE.

REFERENCES CITED

The following references are of record in the file of this patent:

UNITED STATES PATENTS

| Number | Name | Date |
|---|---|---|
| 934,735 | Kengeter | Sept. 21, 1909 |
| 1,209,398 | Converse | Dec. 19, 1916 |
| 1,330,644 | Matson | Feb. 10, 1920 |
| 2,316,272 | Meyer | Apr. 13, 1943 |